United States Patent [19]
Davis

[11] 3,842,967
[45] Oct. 22, 1974

[54] ROTATABLE DISTRIBUTOR-FEEDERS TO TRAVELING RECEPTACLES

[76] Inventor: Richard A. Davis, 115 S. H St., Oxnard, Calif. 93030

[22] Filed: Apr. 30, 1973

[21] Appl. No.: 355,548

[52] U.S. Cl................................ 198/140, 198/152
[51] Int. Cl............................................ B65g 17/12
[58] Field of Search .......... 198/103, 140, 141, 152, 198/167, 142, 153

[56] References Cited
UNITED STATES PATENTS
565,334   8/1896   Dodge................................ 198/141
2,318,658  4/1943   Alvey................................. 198/142
FOREIGN PATENTS OR APPLICATIONS
29,932    7/1922   Denmark........................... 198/142

Primary Examiner—Richard A. Schacher
Assistant Examiner—Joseph E. Valenza
Attorney, Agent, or Firm—C. A. Miketta

[57] ABSTRACT

A distributor-feeder rotatably mounted above a series of receptacles carried by a flexible chain and passing along an arcuate path below said distributor to sequentially receive therefrom, by gravity, particulate material (organic or inorganic, in natural or finely divided form, i.e. seed, beans, condiments, spices, etc.) without loss, spillage or dusting, and deliver the same to higher elevations. The distributor is self-cleaning and maintains feeding contact with preferred type of receptacles for about 60°– 90° of arcuate travel in the gravity loading zone.

8 Claims, 5 Drawing Figures

PATENTED OCT 22 1974  3,842,967

ROTATABLE DISTRIBUTOR-FEEDERS TO TRAVELING RECEPTACLES

Chain-supported and driven elevators provided with bucket-or scoop-type receptacles have been employed in the handling of many raw materials, such as clay, cement, coal, etc., the material to be elevated being generally supplied to such buckets or scoops from an exterior pile or supply, either by permitting the buckets to scrape the material from the side of a pile, or to be filled by hand or from a belt conveyor at a zone where the buckets are already on their way up to a higher elevation. These prior methods of filling the buckets or scoops of the conveyor subject the material being fed to breakage, attrition and injury, creates spillage and dusting and are not satisfactory for the handling of relatively delicate and expensive materials, such as flour, vegetable and oil seeds, lentils and beans, finely divided spices, etc.

The present invention is directed to a device and arrangement whereby the receptacles, carried by a continuously moving chain or chains, are fed by gravity into said receptacles while the latter are moving in an arcuate path at the bottom reach or zone of an elevator, the material being fed directly into the receptacles without being subjected to stray wind currents and without spillage, loss or dusting, and without subjecting the particulate material to attrition or breakage which may injure, damage or impair the quality or viability of the seed or other material being handled. Moreover, the arrangement hereinafter described in detail permits the elevator to be clean at the end of a run with one type of particular material and available for the handling of a totally different seed or material without the necessity of conducting an extensive cleaning operation in order to avoid contamination of the subsequent material with the particulate material handled previously.

Generally stated, the invention provides a distributor-feeder means located between chain-engaging sprockets at the lowermost zone of travel of said chains whereby a particulate material is supplied to a series of spaced receptacles during movement along an arcuate path in a virtually vertical plane. The distributorfeeder is rotated in timed relation with the sprockets, is provided with a series of spaced nozzles which cooperate and move in timed relation with the receptacles, whereby particulate material fed to the interior of said distributor-feeder is supplied by gravity to the receptacles in sequence. The cooperative relationship between the nozzles of the distributor-feeder and the receptacles is important, and such receptacles may take various forms, but a preferred form is described hereinafter.

An object of the present invention is to disclose and provide an arrangement or system which permits uniform and continued loading of receptacles of an elevator with particulate material by gravity without loss, injury or damage to such material.

Another object is to disclose and provide a novel distributor-feeder positioned between and at the lowermost zone of travel of the descending and uprising reaches of a flexible chain-type elevator.

Another object is to provide a self-cleaning distributor-feeder which is provided with means for sequentially cooperating with the series of receptacles moving along an arcuate path below said distributor-feeder, to supply each of such receptacles by gravity with particulate material without subjecting the material to crushing, compression, abrasion, friction, damage, misplacement or loss.

A still further object is to provide a novel receptacle adapted for use with a distributor-feeder of this invention.

These and other objects and advantages of the present invention which solves the problems which have beset the art for many years and now permits the efficient handling of delicate and expensive particulate materials, such as small vegetable and flower seed, comminuted spices, cloves, edible legumes and beans, etc., will be readily understood from the following description.

To facilitate understanding, reference will be had to the appended exemplary drawings, in which.

Figure 1:
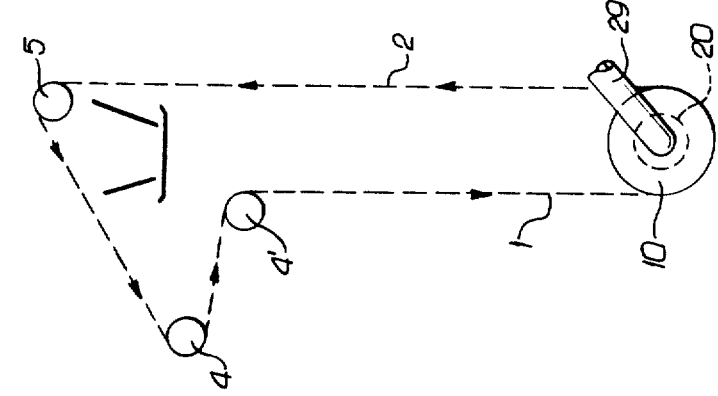
FIG. 1 is a schematic representation of a typical elevator embodying the present invention.

FIG. 1 is a schematic side view of an elevator employing continuous, flexible, link-type chains in parallel relation, said chains carrying receptacles therebetween; only one of said chains is shown in FIG. 1, the downwardly moving lay being indicated at 1 passing over a sprocket wheel 10 at the lowermost portion of the elevator and then moving upwardly, as indicated at 2. The upwardly directed lay passes over a smaller sprocket 5 at the dumping point or position and then continues on its return downward trip over guide sprockets 4–4', to pass again over the main sprocket 10. Between the two sprockets in the lowermost position, the distributor-feeder is located, as indicated at 20; the various receptacles carried by the chain elevator are filled while moving in the arcuate path immediately beneath the distributor-feeder, the latter being fed with particulate material through a conduit 29 extending through an axial aperture in the sprocket 10.

Figure 2:
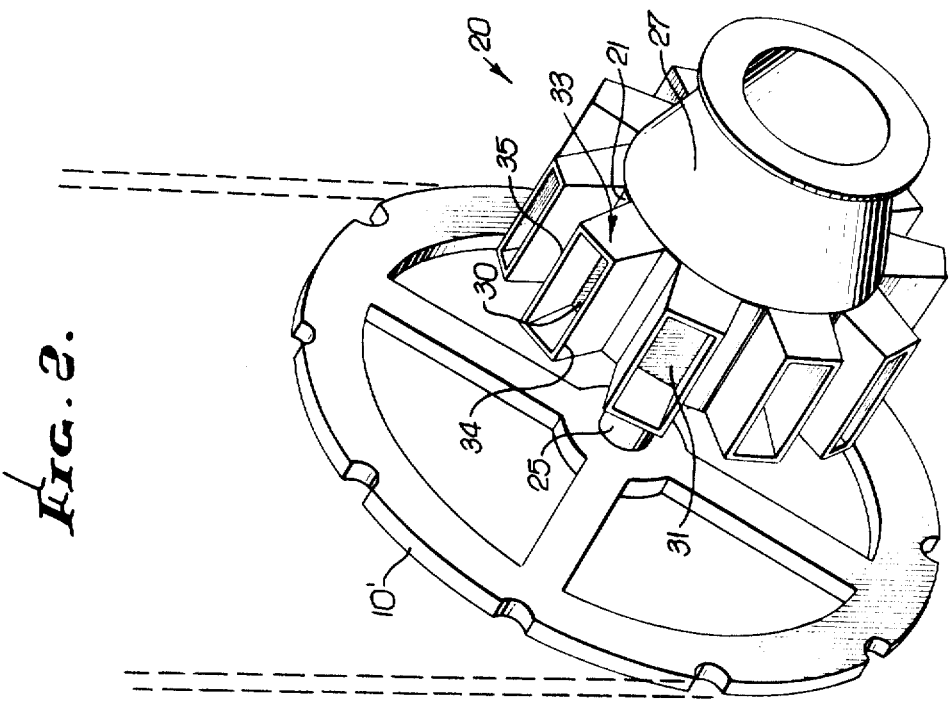
FIG. 2 is an isometric representation of a distributor-feeder embodying the present invention.
Figure 4:
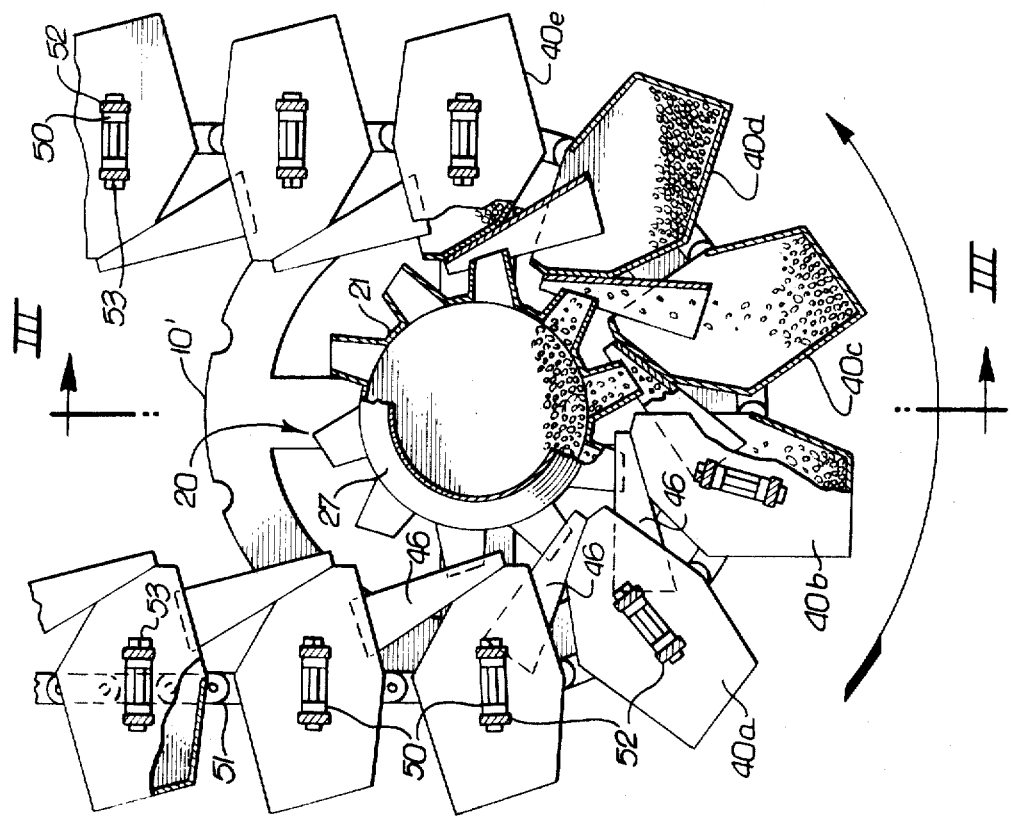
FIG. 4 is a side view taken approximately along the plane IV—IV of FIG. 3 showing a series of receptacles occupying positions along an arcuate path beneath the distributor-feeder, some portions being shown in section.
Figure 3:
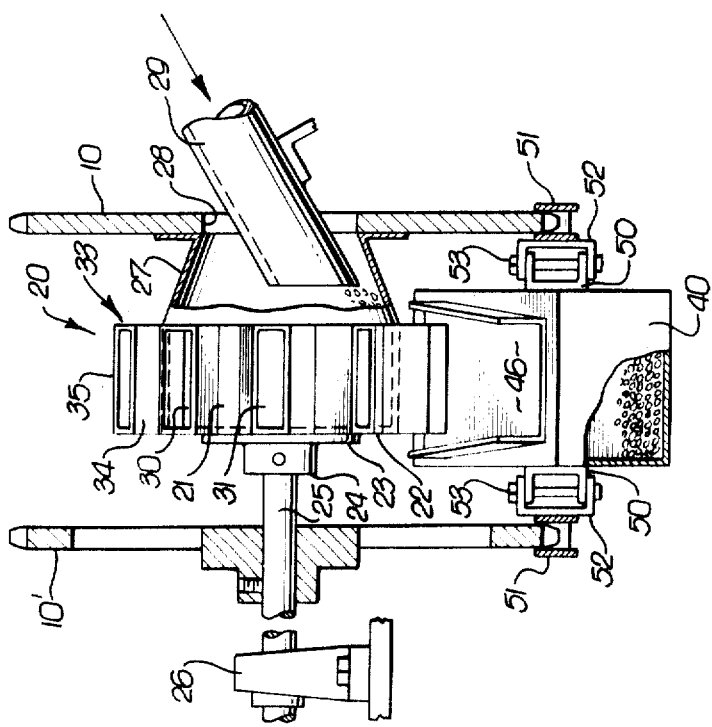
FIG. 3 is a simplified rear view of the distributor-feeder positioned between spaced sprockets illustrating means for supplying the feeder with particulate material and a single receptacle in cooperative relation to one form of receptacle in filling position.

As shown in FIGS. 2, 3 and 4, the distributor-feeder 20 is a cylinder 21 provided with one closed end at 22. Mounting means are connected to said closed end for imparting rotation to said cylinder about a horizontal axis concentric with the arcuate path of travel of receptacles moving below the cylinder. Such mounting means may include a plate 23 attached to the closed end 22, said plate 23 being provided with a boss 24 having an axial bore. The bore in the boss receives and is attached to a horizontal shaft 25 which extends through an axial bore in the sprocket 10' and a suitably firmly supported bearing or bearings 26. Suitable driving means are provided for imparting rotation to said shaft or to a shaft carrying a pair of sprockets in engagement with a flexible link chain at an upper level, as for example, at 4 (FIG. 1), but driving means are not indicated in the drawings. The base edge of a frusto-conical member 27 is shown welded to the open end of cylinder 20. The smaller end of the conical member 27 is firmly connected to sprocket 10 which is provided with an axial opening 28 of a diameter equal to that of such small end. The sprocket 10 may be a circular plate suitably notched to receive the driving chains. Extending into the conical member 27 through the port 28 is a conduit or duct 29 associated with the source of particulate material, whereby the interior of the distributor-feeder 20 may be constantly supplied with material when the apparatus is being used. Since the distance between the two sprockets 10 and 10' rarely exceeds 12 or 18 inches, it is normally not necessary to provide separate bearing means for supporting and positioning the sprocket 10, although such means can take the form of a bearing collar surrounding the port 28 made therein.

A plurality of elongated, horizontally extending and circumferentially spaced feeder ports 30, 31 and the like, are formed in the cylinder 21. Each of said ports is provided with a nozzle (generally indicated by 33) extending outwardly of the surface of the cylinder. The ports and nozzles are preferably equal in length to the axial length of the cylinder. Each nozzle may be made of sheet metal and includes end wall portions as well as a leading wall 34 and a trailing wall 35. It has been found desirable to have the edges of trailing wall portions extend radially further away from the surface of the cylinder than the leading edge of the leading wall ("leading" being correlated to the direction of rotation indicated in the drawings by an arcuate arrow).

Figure 5:
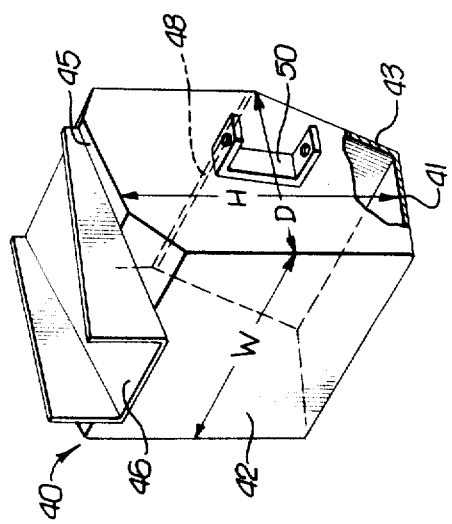
FIG. 5 is a pictorial representation of one form of a chain-driven receptacle adapted for use with the distributor-feeder.

A preferred form of receptacle is pictorially represented in FIG. 5. As there shown, the receptacle 40 is an almost completely enclosed, hollow container which, in position to receive material from the distributor, may be said to have a width (indicated at W) greater than the length of a nozzle, a height (H) exceeding the width and a major depth (D) at a zone at about 0.4 to 0.6 of the height. The wall portions may be referred to as bottom 41, rear wall 42, front wall 43 and top wall 45, the latter being inclined toward the bottom and rear. The bottom 41 is generally narrower than the maximum depth, whereby the two side walls are irregular polygons. Carried upon the rearwardly inclined top wall 45 is a chute (wider than a distributor nozzle and adapted to receive a nozzle) said chute sloping rearwardly and becoming somewhat narrower and extending beyond an extension of the back wall. The side walls of chute 46 are of increasing height toward the open rear end but the height and width of the chute permits it to enter a port between the side walls of the following receptacle.

It may be noted that the front wall has an upper edge and terminates at 44, thereby forming the boundary of an opening between such edge and the top wall 45 and the side panels. The rearward extension of a preceding receptacle may enter such opening during material-receiving positions of these receptacles. The unique configuration of receptacles permits a large number thereof to be used per lineal foot of chain, increases the capacity and performance of the elevator and protects the material while being elevated.

Each of the preferred receptacles is attached to both of the chains being moved in unison by sprockets 10 and 10', and the attachment means may comprise a connection which maintains a receptacle in a fixed position with respect to a link in the chain or permits a limited amount of pivotal movement. As illustrated in FIG. 3, the connection is releasable but fixed. Each side of receptacle 40 carries a U-shaped fitting 50 (welded or riveted thereto); an appropriately positioned link 51 of each chain is also provided with a U-shaped fitting 52 with the base thereof virtually perpendicular to the longitudinal axis of the link, and short, parallel arms spaced to embrace the arms of fitting 50. The arms of elements 50 and 52 are provided with aligned apertures to permit a locking pin 53 to extend through all such apertures or bores and hold the receptacle in position between the chains. Such virtually rigid connection insures proper positioning of the receptacles while moving along the arcuate filling path below the distributor-feeder, maintains the receptacles with the opening directed upwardly during upward movement, and insures rapid and positive inversion upon passing over a dumping sprocket, as at 4 (FIG. 1).

FIG. 4 illustrates a series of receptacles 40a, 40b, 40c, 40d and 40e moving in timed relation to rotation of the distributor-feeder 20. It will be noted that although a feeder nozzle had entered the chute 46 of each of this series of receptacles even prior to the position of 40a, receptacle at 40a will start to receive material from nozzle 30' and chute 46 of the receptacle in position 40b and such loading of 40a will continue while 40a moves through positions 40b, 40c and 40d. Due to rotation of the distributor cylinder, the level of particulate material therein is inclined, but the reverse feed flow from the chute of a preceding receptacle to a succeeding one permits a large volume of material to be supplied to each receptacle.

One of the great advantages of the present invention lies in the compact arrangement, since the distributor can be positioned between a pair of sprocket wheels carrying the pair of elevator chains and rapidly load the receptacles while they traverse a path of 70° to 120°. The volume of particulate material loaded and elevated per hour (without loss, wastage and dusting) is good, no matter what type or form of receptacle is used, but unusual and unexpected efficiency is attained when the cooperative action between distributor nozzles and the preferred form of receptacles is employed. Throughout the loading sequences in positions 40a, b, c, the cooperation of nozzles and chutes provides walls which protect the particulate material from lateral air currents which may cause loss of material by being air-borne and dusting. It is to be noted that when a leading receptacle has advanced beyond a point where a nozzle cannot load such leader, the chute carried by the leader cooperates with the succeeding receptacle to load the latter.

I claim:

1. A distributor-feeder for supplying particulate material by gravity to a series of spaced receptacles during movement along an arcuate path in a virtually vertical plane, said distributor-feeder comprising:

a cylinder having a closed end and mounting means connected to said closed end for rotation of said cylinder about a horizontal axis concentric with the arcuate path of a series of spaced receptacles moving below said cylinder;

a frusto-conical guide with its base connected to the other, open end of said cylinder, the small end of said guide being adapted to receive a conduit associated with a source of particulate material;

a plurality of elongated, horizontally extending, spaced feeder ports in the cylindrical wall of said distributor, each port including a nozzle provided with walls extending outwardly of said cylinder.

2. A distributor-feeder as stated in claim 1, including a sprocket carried by said mounting means and rotatable with said rotatable feeder, a link chain in engagement with said sprocket, said chain being provided with a series of receptacles for travel beneath said distributor feeder in spaced relation correlated to the spacing of said nozzles to receive particulate material therefrom during travel of about 60° of arc.

3. A distributor-feeder as stated in claim 1, wherein each port is virtually as long as the axial length of the cylinder, each nozzle being provided with a trailing edge extending beyond the leading edge of the nozzle.

4. A distributor-feeder as stated in claim 1, including a sprocket carried by said mounting means and rotatable with said rotatable feeder, another sprocket, provided with an axial aperture adapted to receive said source conduit, connected to the small end of the frustoconical guide for coaxial rotation with said cylinder and first sprocket;

a continuous link chain in engagement with each of said sprockets, a series of receptacles connected to said chains for movement therewith and for travel beneath said distributor-feeder in spaced relation correlated to the spacing of said nozzles to receive particulate material therefrom during such travel.

5. A distributor-feeder as stated in claim 4, wherein each of the receptacles is provided with a chute portion having side walls adapted to receive a nozzle and direct particulate material discharged therefrom into a receptacle.

6. A cylindrical distributor-feeder mounted for rotation about a horizontal axis and above a series of spaced receptacles moving in an arcuate path below said distributor, said distributor being provided with a plurality of elongated, horizontally extending, circumferentially spaced ports, each of said ports being provided with a nozzle extending outwardly of said cylindrical distributors;

a pair of flexible link-type chains driven in timed relation to the rotation of said cylindrical distributor, said chains supporting therebetween said series of spaced receptacles; each receptacle comprising a walled, hollow body with only the upper section of the forward wall open, each receptacle being provided with a rearwardly inclined upper wall bearing a chute provided with upstanding sides adapted to receive a nozzle of the distributor-feeder, said chute extending rearwardly beyond the rear wall of the body and simultaneously narrowing to extend into the open, upper section of the forward wall portion of the receptacle next in series when said receptacles are moving along an arcuate, material-receiving path, beneath the distributor-feeder.

7. In a combination as stated in claim 6, the provision of means for removably attaching each of said receptacles to said chains and maintain a desired position of the ported front wall with respect to the longitudinal axis of links carrying the receptacle whereby said ported front wall is positioned in a plane virtually perpendicular to the axis of the links carrying such receptacle.

8. A combination as stated in claim 7, wherein the means for attaching and positioning a receptacle with respect to its carrying links comprises a ported fitting attached to each side wall of a receptacle, a ported element attached to a link on each chain and adapted to engage said fitting, and a locking pin extending through aligned ports in such fitting and element.

* * * * *